(No Model.)

E. M. HEWSON.
COCK AND COUPLING FOR BARRELS, &c.

No. 568,572.  Patented Sept. 29, 1896.

WITNESSES:
F. L. Ourand
W. L. Coombs

INVENTOR:
Edward M. Hewson,
by Louis Bagger & Co.
Attorneys.

UNITED STATES PATENT OFFICE.

EDWARD M. HEWSON, OF MECHANICSVILLE, NEW YORK, ASSIGNOR OF ONE-HALF TO NICHOLAS E. LYTTLE, OF SAME PLACE.

COCK AND COUPLING FOR BARRELS, &c.

SPECIFICATION forming part of Letters Patent No. 568,572, dated September 29, 1896.

Application filed April 11, 1895. Serial No. 545,366. (No model.)

*To all whom it may concern:*

Be it known that I, EDWARD M. HEWSON, a citizen of the United States, and a resident of Mechanicsville, in the county of Saratoga and State of New York, have invented certain new and useful Improvements in Cocks and Couplings for Barrels, &c.; and I do hereby declare that the following is a full, clear, and exact description of the invention, which will enable others skilled in the art to which it appertains to make and use the same, reference being had to the accompanying drawings, which form a part of this specification.

My invention relates to improvements in that class of combined cocks and couplings for use in connection with casks, barrels, and other receptacles for containing liquors under pressure which are composed of two separable sections, one of which is permanently secured to the cask or barrel, while the other is adapted to be connected with said permanent section when it is desired to draw off the contents of the receptacle.

The invention consists in the novel construction and combination of parts hereinafter fully described and claimed.

Figure 1:
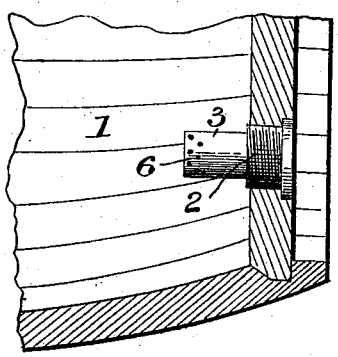
Figure 2:
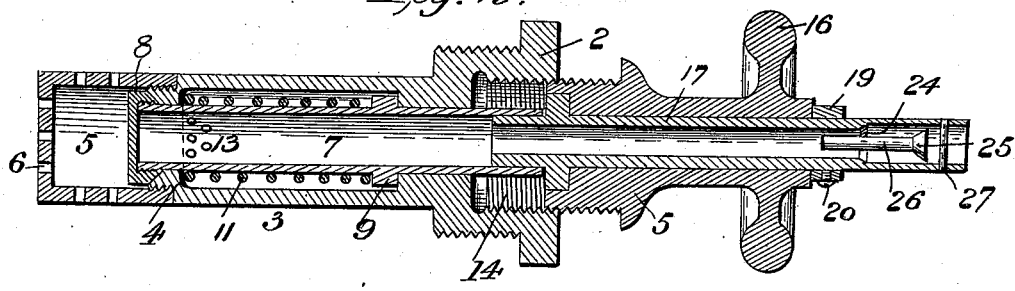
Figure 3:
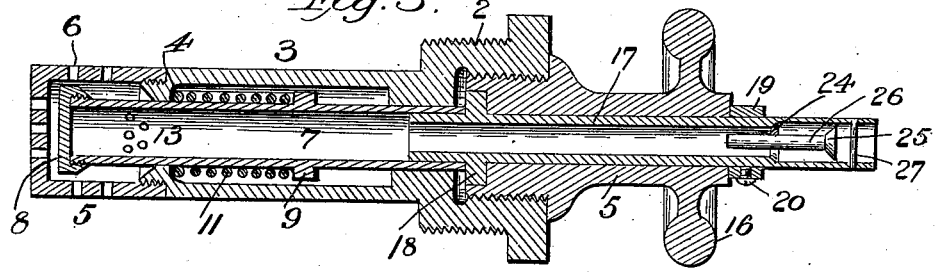
Figure 4:
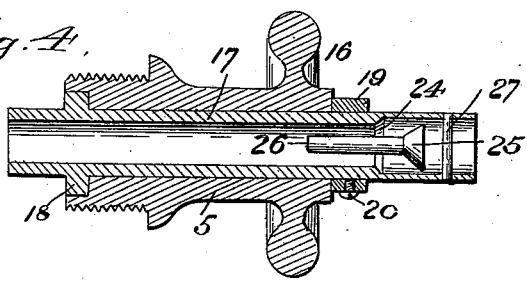

In the accompanying drawings, Figure 1 is a longitudinal sectional view of a portion of a cask or barrel, showing the stationary or plug section secured thereto. Fig. 2 is a longitudinal sectional view of the two sections connected together and the valve closed. Fig. 3 is a similar view showing the valve open to allow the contents of the barrel or cask to be withdrawn. Fig. 4 is a similar view of the removable section detached from the plug.

In the said drawings the reference-numeral 1 designates a cask or barrel, and 2 the removable section or plug, having its outer end screw-threaded exteriorly, by which it may be connected with the head or other portion of the barrel. This plug is formed with a cylindrical portion 3, having at its inner end a beveled valve-seat 4, and connected with said end is a screw-cap 5, formed with a series of apertures 6. Located in this cylinder and cap is a slidable or movable tubular valve-stem 7, the inner end of which is screw-threaded to receive a correspondingly-threaded adjustable valve 8, which is beveled to correspond with the valve-seat 4, and intermediate its ends is formed with a collar 9. Abutting against the valve-seat is a rubber or other washer 10, between which and the collar 9 is confined a coiled spring 11. Near the lower end the said stem is formed with a number of apertures 13. The outer end of the stem projects through the plug into a recess 14 in the outer end thereof, which is screw-threaded interiorly to receive the correspondingly-threaded end of the removable section 15. This section is formed with a cylindrical bore, and at its outer end is provided with a hand-wheel 16, by which it may be rotated. Located in said section is a tubular supply-pipe 17, the inner end of which is of smaller diameter then the bore of the valve-stem, so as to telescope therein, and near the inner end the pipe is formed with a collar 18, fitting in a recess in the inner end of the removable section. The outer end of the pipe is provided with a collar 19, having a set-screw 20, by which it is held in place, and, in connection with the collar 18, prevents the pipe from sliding or moving horizontally. Resting against the shoulder 21 in the plug 2 is a rubber or other washer 23. The outer end of the supply-pipe is enlarged and beveled, as seen at 24, forming a seat for a correspondingly-beveled check-valve 25, having a stem 26. The numeral 27 designates a pin passing through the enlarged portion of the supply-pipes.

The operation is as follows: The plug 2, as before stated, is permanently secured to the barrel, and the spring 10 forces the valve 8 against its seat and prevents the entrance of liquor to the cylinder 3, the pressure of the liquor in the receptacle also aiding in holding the valve in place and making a tight joint. To withdraw the contents of the barrel, the outer end of the supply-pipe is connected with a hose or pipe (not shown) leading to the cock or faucet and the inner end of the removable section inserted in the plug or stationary section, the reduced end of the supply-pipe telescoping in the outer end of the valve-stem 7, making a tight joint therebetween. The said removable section is then rotated and, its screw-threads engaging with the threads in the plug, it, together with the supply-pipe, will be forced inward, and the collar 18, pressing against the end of the stem 7, will force it inward, causing the valve 8 to be opened or forced away from its seat, when the liquor will enter the cap through the apertures therein and will escape through the apertures in the stem to the supply-pipe and from thence to the cock or faucet.

By the above construction it will be seen that by reason of the supply-pipe telescoping into the tubular stem and the collar and washer a tight joint is made, preventing the escape of liquor from the barrel, and by locating the coiled spring in the barrel in front of the valve 8 and the washer 10, abutting against the valve-seat, a tight joint is made at this point, preventing the entrance of the liquor to the cylinder when the valve is closed, which would have a tendency to corrode the spring and damage the liquor.

The object of the check-valve at the outer end of the supply-pipe is that when the removable section is detached from the plug the back pressure of the liquor in the hose or pipe connected with the supply-pipe will close the same and prevent the escape of the liquor in said hose or pipe.

Having thus fully described my invention, what I claim is—

The combination with the screw-threaded plug adapted to be screwed into a barrel, or other receptacle, having a screw-threaded recess in its outer end and formed with an inwardly-extending cylinder having an annular flange at the inner end beveled to form a valve-seat, and the removable apertured screw-cap connected with said cylinder, of the slidable tubular stem having apertures near the inner end, the adjustable valve at the end thereof, the collar on said stem, the washer resting against said flange, the coiled spring interposed between said collar and washer, the removable screw-threaded section engaging with said plug having an annular recess in its inner end, the supply-tube telescoping into the end of said stem, the collar on said pipe seated in said recess and bearing against the stem and the outwardly-opening check-valve in the outer end of the supply-tube, substantially as described.

In testimony that I claim the foregoing as my own I have hereunto affixed my signature in presence of two witnesses.

EDWARD M. HEWSON. [L. S.]

Witnesses:
NICHOLAS E. LYTTLE,
AUGUSTUS BUFFINTON.